United States Patent
Ukechi et al.

(10) Patent No.: US 6,685,870 B2
(45) Date of Patent: Feb. 3, 2004

(54) METHOD AND APPARATUS FOR MANUFACTURING PHOTONIC CRYSTAL ELEMENT

(75) Inventors: Mitsuo Ukechi, Tokyo (JP); Ryoji Kaku, Tokyo (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 258 days.

(21) Appl. No.: 09/796,663

(22) Filed: Feb. 28, 2001

(65) Prior Publication Data

US 2001/0042944 A1 Nov. 22, 2001

(30) Foreign Application Priority Data

Mar. 3, 2000 (JP) ........................................ 2000-058659

(51) Int. Cl.⁷ .............................................. B29C 43/10
(52) U.S. Cl. ...................... 264/437; 264/108; 264/313; 425/174; 425/405.2
(58) Field of Search .................... 264/437, 438, 264/439, 440, 108, 313; 425/405.2, 174, 174.8 R, 174.8 E

(56) References Cited

U.S. PATENT DOCUMENTS

| | | | |
|---|---|---|---|
| 3,066,355 A | * | 12/1962 | Schloemann et al. |
| 5,688,318 A | | 11/1997 | Milstein et al. |
| 5,851,568 A | | 12/1998 | Huang |
| 5,997,795 A | * | 12/1999 | Danforth et al. |

FOREIGN PATENT DOCUMENTS

| | | |
|---|---|---|
| EP | 0646937 | 4/1995 |
| JP | 2-521306 | 7/2002 |
| WO | WO9828320 | 7/1998 |
| WO | WO 0006506 | 2/2000 |

* cited by examiner

Primary Examiner—Mathieu D. Vargot
(74) Attorney, Agent, or Firm—David N. Lathrop, Esq.; Gallagher & Lathrop

(57) ABSTRACT

Fine particles (23) are oriented and dispersed in a polymer medium to obtain a composite material (24), which is high-density compression molded to such a size that a photonic band gap develops, thereby obtaining a photonic crystal element (26). The orientation of the fine particles (23) in the polymer medium can be carried out on a scale (tens of micrometers to several millimeters) where required manipulations can be done with ease.

11 Claims, 3 Drawing Sheets

METHOD AND APPARATUS FOR MANUFACTURING PHOTONIC CRYSTAL ELEMENT

BACKGROUND OF THE INVENTION

The present invention relates to a method and apparatus for the manufacture of a photonic crystal element.

The photonic crystal element is an artificial crystal in which two kinds of media of vastly different refractive indices (dielectric constants) are arranged regularly with a period of the order of light wavelength. Conventionally, the photonic crystal element of such a structure is manufactured using an apparatus of such a construction as depicted in FIG. 1.

The apparatus of FIG. 1 is designed to orient dielectric fine particles 13 two or three-dimensionally in a container 12 placed on an XY stage 11. A spray source 15 is driven and controlled so that fine particles 13 contained in a powder container 14 are jetted out, for example, one by one from a jet nozzle 16, while at the same time the XY stage 11 is driven to orient the fine particles 13 in a desired pattern.

In this example, the jet nozzle 15 is mounted on a Z stage 17 in a manner to be movable in a Z direction (in the vertical direction). Reference numeral 18 denotes a DC servomotor for driving the Z stage 17. The spray source 15, the DC servomotor 18 and a DC servomotor (not shown) for driving the XY stage 11 are driven and controlled by a controller 19.

With the conventional photonic crystal element manufacturing method using the above-described apparatus, it is necessary, for the emergence of a photonic band gap in the light wavelength band, to arrange the fine particles on the order of light wavelength (submicron to several microns); that is, the jet of the fine particles and the XY stage need to be controlled with such an extremely high degree of accuracy.

Since such control presents serious difficulties, however, the manufacture of the photonic crystal element is not easy; in particular, much difficulties are encountered in manufacturing the photonic crystal element as intended.

In U.S. Pat. No. 5,651,818 there is disclosed a method of preparation of a photonic crystal element from a composite material. According to this conventional method, the photonic crystal element is fabricated by impregnating a reticulated mesh formed in a metal column of a high-melting point such as tungsten (W), by capillary action, with liquid material of a melting point lower than that of the metal column, such as aluminum oxide, and dissolving the metal column after the liquid material solidifies. With this method, however, it is difficult to form the photonic crystal element with reticulated mesh spacing held uniform in the entire body of the photonic crystal element on the order of light wavelength.

SUMMARY OF THE INVENTION

It is therefore an object of the present invention to provide a method that permits easy orientation of fine particles and hence facilitates the manufacture of photonic crystal elements, and an apparatus that implements the method.

The photonic crystal element manufacturing method according to the present invention comprises the steps of: orienting and dispersing fine particles in a polymer medium to obtain a composite material; and performing high-density compression molding of the composite material to compress it to such a size that a photonic band gap emerges, thereby obtaining a photonic crystal element.

In the above method, the high-density compression molding of the composite material is carried out by isostatic press through a pressure medium.

In the above method, the composite material is heated at the time of its high-density compression molding.

In the method, the fine particles are magnetic fine particles and an electromagnetic field is applied to the composite material at either one or both of the times of orientation and dispersion or high-density compression molding.

The apparatus according to the present invention for manufacturing a photonic crystal element from a composite material with magnetic fine particles oriented and dispersed in a polymer medium, comprises: means for applying an isostatic pressure to said composite material; means for heating said composite material; and means for applying an electromagnetic field to said composite material.

DETAILED DESCRIPTION OF THE PREFERRED EMBODIMENTS

Figure 1:
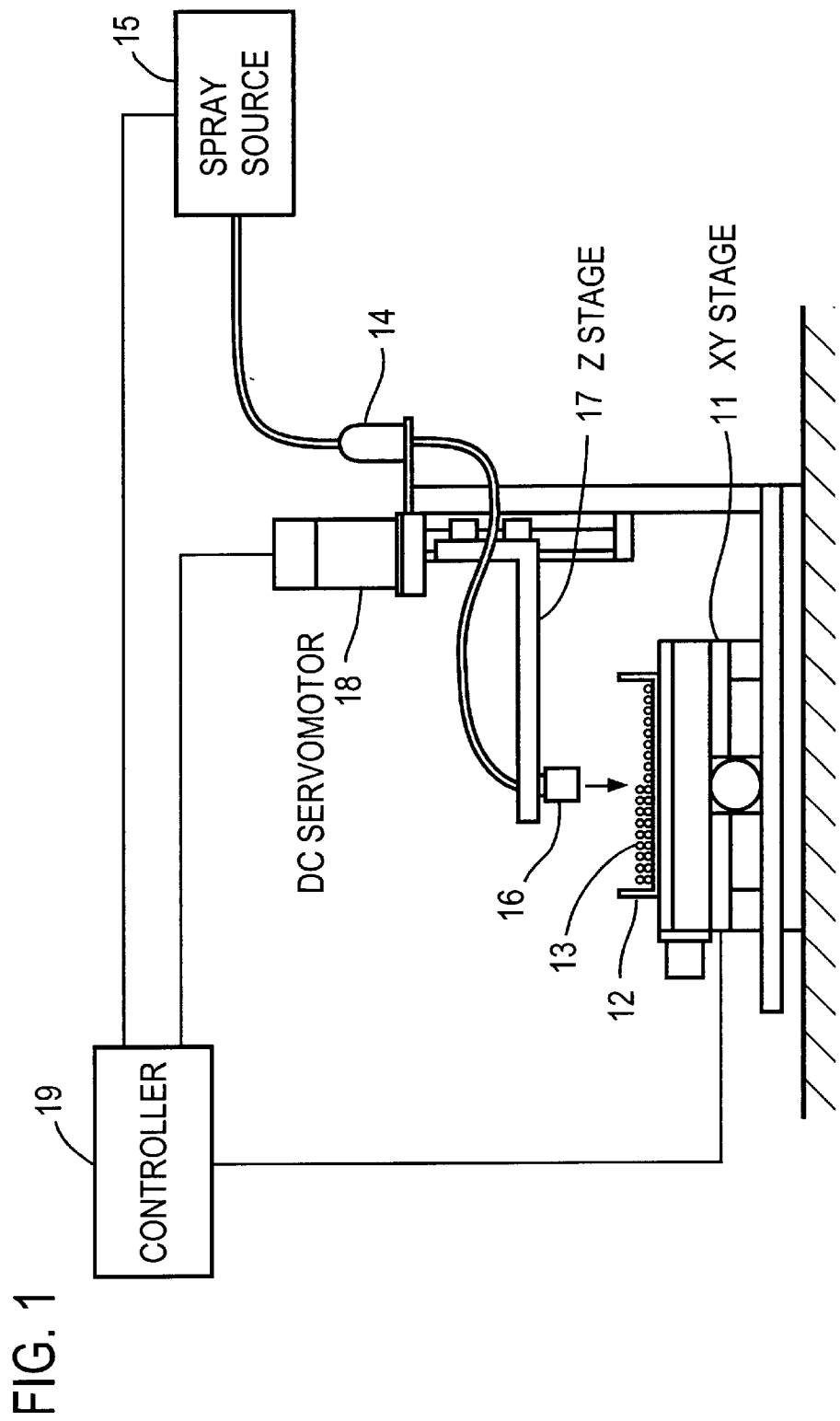
FIG. 1 is a schematic diagram for explaining a conventional photonic crystal element manufacturing method.
Figure 2:
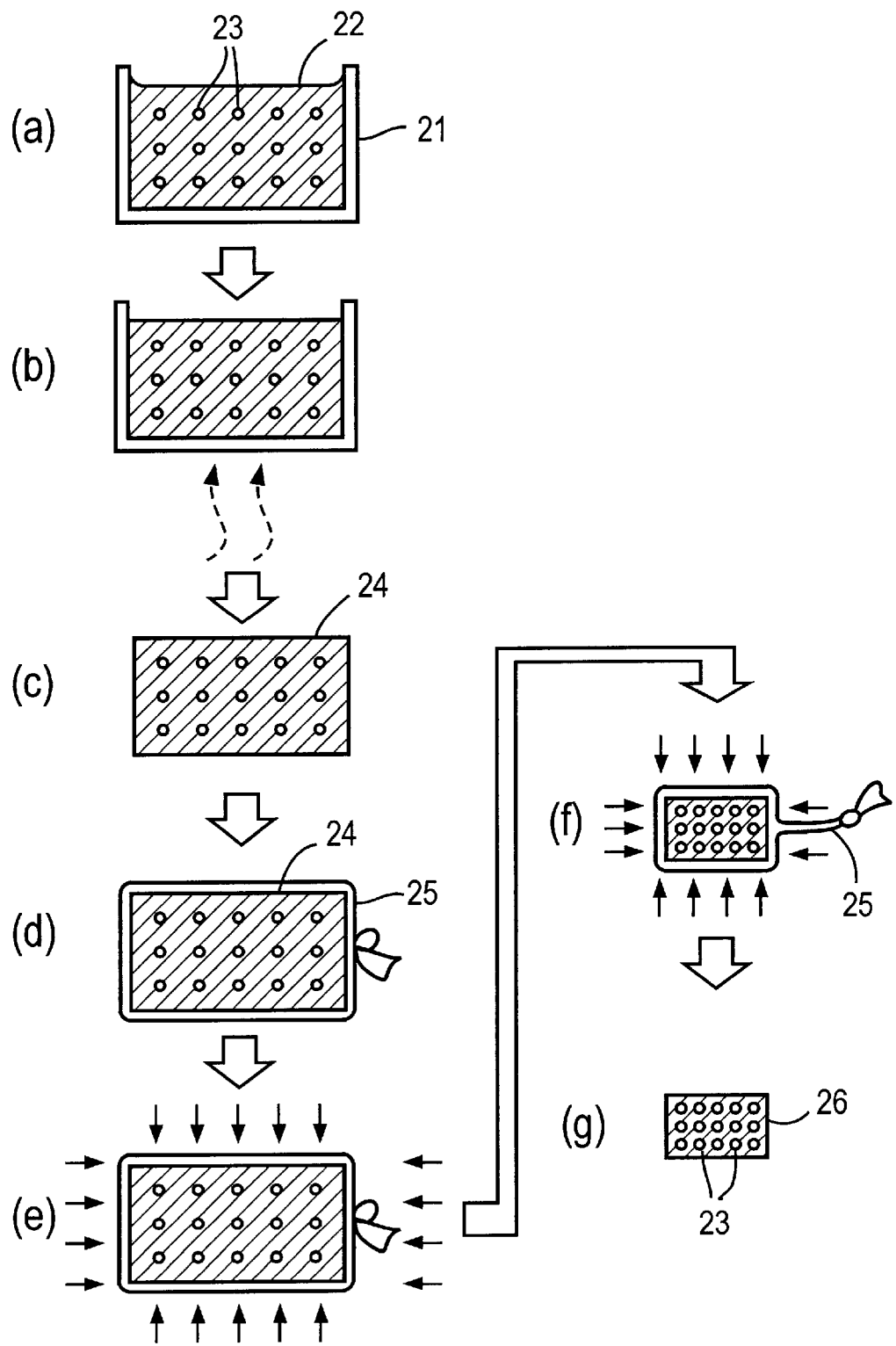
FIG. 2 is a schematic diagram for explaining an embodiment of the photonic crystal element manufacturing method according to the present invention.

FIG. 2 schematically illustrates a sequence of steps involved in the manufacture of the photonic crystal element according to an embodiment of the present invention. The manufacturing steps (a) to (g) will be described below in due order.

Step (a): A liquid polymer 22 is poured as a medium into a container 21, and fine particles 23 are oriented and dispersed in the liquid polymer 22. The fine particles 23 are spaced apart, for example, tens of micrometers ($\mu$M) to several millimeters (mm).

Step (b): The liquid polymer 22 in the container 21 is set by heating with an electric furnace or the like (not shown).

Step (c): A solid composite material 24 is obtained by the heat-setting of the liquid polymer 22. The composite material 24 by steps (a) and (b) can be obtained using a known method.

Step (d): The composite material 24 is taken out of the container 21 and hermetically sealed in a plastic bag or similar sealing envelope 25.

Step (e): Isostatic pressure is applied to the hermetically sealed composite material 24.

Step (f): The composite material 24 undergoes high-density compression molding by the isostatic pressing while holding the orientation of the fine particles 23 unchanged. At this time the photonic band gap emerges by compressing the composite material 24 to such an extent that the spacing of the fine particles 23 becomes of the order of submicron.

Step (g): Finally, the sealing envelope 25 is removed, with which the manufacture of a photonic crystal element 26 is completed.

As described above, this embodiment uses the conventional composite material producing method such as disclosed, for example, in I. Kaetsu et al, J. Polymer SCi, A-1 10 2203(1972), p.118, and carries out the orientation of the fine particles 23 in the liquid polymer 22 on a large scale (tens of micrometers to several millimeters) where manipulations are easy. And the composite material 24 thus obtained is compressed at a stroke into a high-density molding of such a size that the photonic band gap develops; in this way, the photonic crystal element 26 is manufactured.

The sealing envelope 25 for hermetically sealing the composite material 24 is not limited specifically to the plastic bag but may be a rubber bag or glass capsule as well. The material for the fine particles 23 is alumina or silicon in this embodiment.

Figure 3:
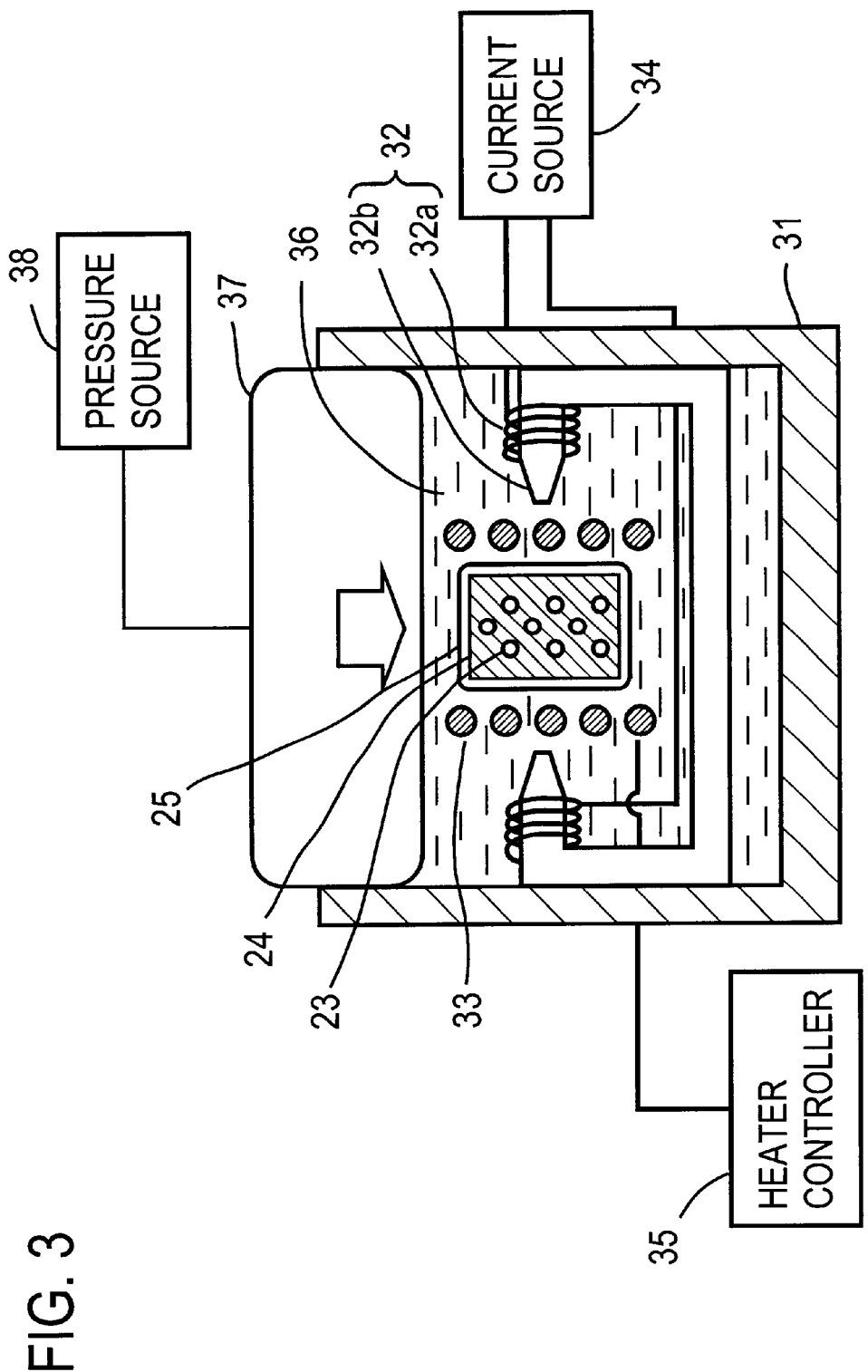
FIG. 3 is a schematic diagram illustrating an embodiment of the photonic crystal element manufacturing apparatus according to the present invention.

FIG. 3 is a schematic showing of an embodiment of the photonic crystal element manufacturing apparatus according to the present invention. This apparatus is suited to producing the photonic crystal element from the composite material 24 made using the fine particles 23 of ferrite or similar magnetic material.

In a cylinder 31 there are placed a pair of opposed electromagnets 32 and a coiled heater 33 as shown. A current source 34 is to supply current to coils 32a of the electromagnets 32, and energization of the heater 33 is controlled by a heater controller 35.

The cylinder 31 is filled with a pressure medium 36, wherein the composite material 24 hermetically sealed in the sealing envelope 25 is placed in a gap defined by the heater 33 with yokes 32b of the electromagnets 32 disposed opposite each other.

The pressure medium 36 may be water, oil, or gas such as argon (Ar) or $N_2$.

A piston 37 engaged with the cylinder 31 is driven by a pressure source 38 to pressurize the pressure medium 36, thereby applying the isostatic pressure to the composite material 24.

With this apparatus, it is possible to apply the isostatic pressure and an electromagnetic field to the composite material 24 by the electromagnets 32 and heat it by the heater 33.

Accordingly, it is feasible to achieve high-density compression molding of the composite material 24 by HIP (Hot Isostatic Press) while at the same time controlling the orientation of the fine particles 23 by applying a high-intensity electromagnetic field to the composite material 24. Hence, the photonic crystal element 26 can easily be manufactured as desired. In the case of heating the composite material 24 by the heater 33, a medium other than water is used as the pressure medium 36.

With the use of the manufacturing apparatus of FIG. 3, the orientation of the magnetic fine particles can be controlled by the application of an electromagnetic field to the composite material 24 during its high-density compression molding. The orientation control for the fine particles (magnetic fine particles) by the application of an electromagnetic field may also be effected at the same time as the composite material 24 is produced, that is, as the fine particles 23 are oriented and dispersed in the polymer medium, or both during the orientation and dispersion of the fine particles 23 and during the high-density compression molding of the composite material 24.

Effect of The Invention

As described above, according to the manufacturing method of the present invention, the composite material in which fine particles are oriented is high-density compression-molded, by which the fine particle spacing is reduced to develop the photonic band gap necessary for the photonic crystal element. Since the orientation of the fine particles is carried out on the scale where the required manipulations are easy to perform, allowing ease in manufacturing the photonic crystal element.

Further, this invention method permits satisfactory high-density compression molding of the composite material by the isostatic press scheme through the pressure medium and achieves control of the orientation of the fine particles by the application of an electromagnetic field during their orientation and dispersion in the pressure medium, thus ensuring a higher level of satisfaction in manufacturing the desired photonic crystal element.

Moreover, the manufacturing apparatus according to the present invention allows application of an isostatic pressure, heat and an electromagnetic field to the composite material in which magnetic fine particles are oriented, and hence the orientation of the fine particles can be controlled—this facilitates the manufacture of the desired photonic crystal element.

It will be apparent that many modifications and variations may be effected without departing from the scope of the novel concepts of the present invention.

What is claimed is:

1. A photonic crystal element manufacturing method comprising the steps of:

(a) orienting and dispersing fine particles in a polymer medium to obtain a composite material; and (b) performing high-density compression molding of said composite material to compress it to such a size that a photonic band gap emerges, thereby obtaining a photonic crystal element.

2. The method of claim 1, wherein said step (b) is a step of performing said high-density compression molding by isostatic press through a pressure medium.

3. The method of claim 1 or 2, wherein said step (b) is a step of heating said composite material at the time of said high-density compression molding.

4. The method of claim 1 or 2, wherein said fine particles are magnetic fine particles and step (b) comprises applying an electromagnetic field to said composite material.

5. An apparatus for manufacturing a photonic crystal element from a composite material with magnetic fine particles oriented and dispersed in a polymer medium, said apparatus comprising:

means for applying an isostatic pressure to said composite material to compress said composite material to such a size that a photonic band gap emerges;

means for heating said polymer medium to obtain said composite material; and means for applying an electromagnetic field to said composite material to orient said magnetic fine particles.

6. The apparatus according to claim 5 wherein:

said polymer medium is contained in a container;

said means for heating heats said polymer material to obtain said composite material while said means for applying an isostatic pressure compresses said composite material; and said means for applying an electromagnetic field applies said electromagnetic field while said means for applying an isostatic pressure compresses said composite material.

7. The method of claim 1 or 2, wherein said fine particles are magnetic fine particles and step (a) comprises applying an electromagnetic field to said composite material.

8. A photonic crystal element manufacturing method comprising the steps of:
   (a) orienting and dispersing fine particles in a liquid polymer contained in a container;
   (b) obtaining from the liquid polymer a solid composite material in which the fine particles are oriented and dispersed such that a photonic band gap cannot emerge; and
   (c) compressing said solid composite material into a compressed composite material in which the fine particles are dispersed such that the photonic band gap emerges, thereby obtaining a photonic crystal element.

9. The method according to claim 8, wherein step (b) comprises heat-setting the liquid polymer.

10. The method according to claim 8 or 9, wherein said fine particles in the solid composite material are dispersed on a scale greater than ten microns and said fine particles in the compressed composite material are dispersed on a scale less than one micron.

11. The method according to claim 8 wherein step (c) applies high-density isostatic compression molding to said solid composite material.

* * * * *